W. A. TURBAYNE.
ELECTRICAL SYSTEM OF DISTRIBUTION.
APPLICATION FILED MAY 2, 1908.
991,106. Patented May 2, 1911.
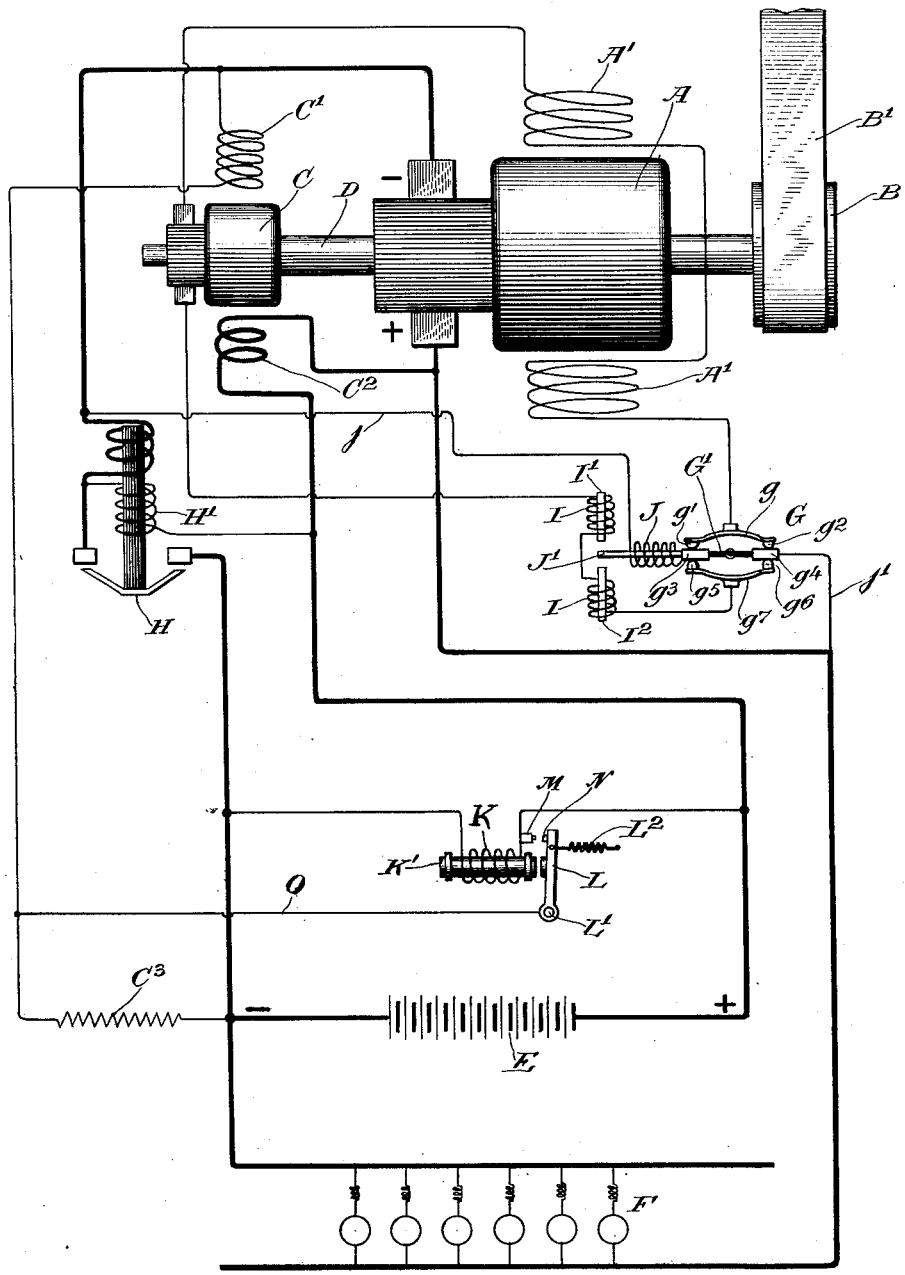
WITNESSES
INVENTOR
Wm. A. Turbayne
BY
ATTORNEYS

UNITED STATES PATENT OFFICE.

WILLIAM A. TURBAYNE, OF LANCASTER, NEW YORK, ASSIGNOR, BY MESNE ASSIGNMENTS, TO GOULD COUPLER COMPANY, A CORPORATION OF NEW YORK.

ELECTRICAL SYSTEM OF DISTRIBUTION.

991,106.  Specification of Letters Patent.  Patented May 2, 1911.

Application filed May 2, 1908. Serial No. 430,461.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to electrical systems of distribution and has been devised for and is especially applicable to car lighting systems in which the main dynamo is actuated by the movement of the car and a storage battery is employed to be charged from said main dynamo to supply the work circuit when the main dynamo is not in operation. My invention is not, however, limited to such a specific system.

A number of features of the system which I shall show and describe and with which my invention may be employed have been described and shown in my Patent No. 954,599, April 12, 1910.

My present invention involves means whereby the operation of the system is more reliable and the arrangement more simple, and whereby the batteries may be charged at a constant rate at all times until the battery is substantially fully charged, at which time improved automatic means are actuated to substantially stop the charging operation by reducing the charging current to a very small value, or entirely eliminating it. I have found that this method of charging the batteries is the most satisfactory in such a system, both from the standpoint of the batteries and from the standpoint of the other apparatus and circuits.

My invention consists of various features of construction, arrangement and combination of apparatus as will be better understood from a description of the specific embodiment shown in the drawing.

The drawing shows diagrammatically a system of distribution embodying one form of my invention.

In the drawing A indicates the main dynamo and A' the field winding thereof. The dynamo is indicated as being driven by a pulley B and belt B' from any suitable source of power, as, for example, the axle of a railway car. C is an auxiliary or regulating dynamo which is mechanically connected to the main dynamo by the shaft D and, therefore, rotates in the same direction as the main dynamo. C' and $C^2$ are field windings of the auxiliary dynamo or generator. E is a storage battery and F a work circuit which, in the present instance, consists of a number of lamps with a regulating resistance in the circuit of each. G is a switch that controls the connection of the field winding A' of the main dynamo. The various portions of the system are shown in the positions they occupy when the system is about to be started up. The switch H is open and the work circuit is being fed from the battery. The coil C' of the auxiliary generator is energized from the battery, the terminals of the coil being connected across the battery through the resistance $C^3$ and generator A. At this time also the auxiliary generator C is connected in a local circuit with the field winding A' of the main dynamo, the circuit being from the upper brush of the auxiliary generator, through the field winding A', thence through the spring $g$ to contacts $g'$ and $g^2$, carried thereby, thence through the contacts $g^3$ and $g^4$ of the pivoted member G' to the contacts $g^5$ and $g^6$ carried on the spring $g^7$, thence through coil 1 to the lower brush of the auxiliary generator. Thus when the machines are started the auxiliary generator will excite the main generator, and since both generators rotate in the same direction the positive terminal of the main generator will always be on the same side.

Upon development of an electromotive force by the main dynamo a current is developed in the local circuit which includes the conductor $j$, coil J, contacts $g^3, g'$, and $g^5$, springs $g$ and $g^7$, contacts $g^2$, $g^6$ and $g^4$ and conductor $j'$. This current energizes a magnetizable member J', extending from the pivoted switch member G'. The arm J' will be attracted upwardly or downwardly by the magnetizable members I' or $I^2$ according to the direction of the current from the auxiliary dynamo. If the arm J' moves upward then the contact arm G' will swing so that the contact is broken between $g^3$ and $g^5$ and between $g^2$ and $g^4$, whereas if it is attracted downward the contact arm G' will break contact between $g'$ and $g^3$ and between $g^4$ and $g^6$. These connections throw the field A' in circuit with the main generator A and auxiliary generator C and cause the field A' to be very rapidly built up.

When the electromotive force of the main generator has reached its normal value, the switch H is closed by the action of the coil H'. This throws the work circuit and battery in series with the main generator and a heavy current passes through the coil $C^2$. At the same time the coil C' is short-circuited and it will have practically no effect as an exciting element. The heavy current in coil $C^2$ now reverses the polarity of the generator C and causes it to become a counter-machine to oppose the electromotive force of the main dynamo. As the current varies in this coil the counter-electromotive force of the auxiliary generator will vary and the electromotive force of the main dynamo will vary, the arrangement being such that as the current in coil $C^2$ increases the electromotive force of the main dynamo will decrease and vice versa, thus regulating the main dynamo to give a substantially constant current through the coil $C^2$.

The tendency in such a system is, as has already been pointed out, to keep the current in coil $C^2$ constant and, therefore, to keep the battery charging current constant, but, it has been found advantageous to markedly and materially decrease or eliminate this charging current when the battery has become charged to the proper extent. To accomplish this a solenoid K is connected directly across the battery terminals so that it will be subject to the battery voltage at all times. This solenoid is provided with a core K' and an armature L pivoted at L' and adapted to be drawn toward the core K' against the action of a spring $L^2$. At its positive terminal, the solenoid K is provided with a contact terminal M adapted to contact with the terminal N on the armature L when the latter is drawn toward the core K' under the action of the solenoid K. The armature L, and consequently the contact terminal N is connected to the coil C', between it and the resistance $C^3$ by a conductor O. The parts are so adjusted that when the battery voltage rises to that point where it has received the proper charge, the electromagnetic strength of the solenoid K becomes great enough to overcome the opposing force of spring $L^2$ and the armature N is drawn toward the solenoid and the contact terminals M and N are brought together. This throws the field coil C' directly across the terminals of the generator A and its connections are practically reversed and a strong current is forced therethrough by said generator. This current will be in the opposite direction from that originally furnished the coil C' by the battery, and the coil C' will aid the coil $C^2$ and the opposing electromotive force of the auxiliary generator C will be materially increased. This action cuts down the effective voltage of the main generator A, thereby materially reducing or eliminating the charging current produced thereby.

The resistance $C^3$ is inserted to cut down the value of the exciting current in the coil C' when the machines are being started up and to prevent the battery becoming short circuited upon the actuation of lever L. It is only necessary that a very small excitation be provided by the coil C' to cause the machines to properly build up and the resistance $C^3$ prevents a needless waste of current for this purpose.

When the generators are at rest the lamps or other load at F are fed by the battery and the switch H is open to prevent a reverse current flowing from the battery through the main generator A. The field coil C' is provided with a weak current from the battery as above explained. When the generators are started up the generator C, excited by the coil C', will produce an exciting current in the field windings A' in such a direction as to always maintain the same brush of the main generator positive. This current also operates the pole changer G to properly connect the field windings A' in shunt with armature of generator A to maintain this condition of polarity. The machine now will build up independently of the generator C although it may be aided somewhat thereby. When the voltage of generator A reaches its normal value the switch H is closed by the coil H' and the coil C' becomes short-circuited. If the battery is in a more or less discharged condition a charging current will flow through coil $C^2$ in such a direction as to cause the auxiliary generator C to oppose the main generator. If the charging current increases the opposition of generator C increases and this tends to cut down the charging current to its normal value. If the charging current decreases, as by a decrease in speed, the reverse operations take place. When the battery has become sufficiently charged as indicated by the voltage across its terminals the solenoid K causes the contact terminals M and N to be brought together and the field coil C' to be connected directly across the generator A. A heavy current will now flow through the coil C' in the opposite direction so that it will aid the exciting coil $C^2$ and the opposing action of the auxiliary generator C will be materially increased. This cuts down the voltage of the main generator and the charging current is thereby greatly reduced, or eliminated so that the battery may float across the mains.

From the above it will be seen that I have provided a most simple and effective means for regulating the action of the generator. By my improvements only two regulating coils are used, one in the battery circuit and the other arranged to be energized when the battery becomes fully charged. By the use of two such coils on the electric device C the arrangement, construction and operation is much simplified and the regulation is made extremely close and reliable.

Although I have shown one embodiment of my invention as applied to an axle lighting system of electrical distribution I do not limit myself to the details of construction and combination of this particular embodiment, but include such modifications therein as are within the principle of my invention as set forth in the appended claims.

Having thus fully described my invention what I claim and desire to secure by Letters Patent is:

1. In an electrical system of distribution, the combination of a main generator, a storage apparatus in operative relation thereto, an auxiliary generator having field windings responsive to changes in the current to the storage apparatus for regulating the output of the main generator, and an electromagnetic device for regulating the action of said auxiliary generator responsive to the change in the electromotive force of the storage apparatus.

2. In an electrical system of distribution, the combination of a main generator, a battery in operative relation thereto, an auxiliary source of electromotive force for regulating the charging current of the main generator, a coil in the battery circuit for regulating said source, an electroresponsive device actuated upon a change of battery voltage to cause the auxiliary source to suddenly and markedly decrease the charging current.

3. In a system of electrical distribution, the combination of a main generator, a battery in operative relation thereto, an auxiliary generator provided with a field coil for fixing the polarity of the main generator and means for reversely connecting said field coil when the voltage of the battery rises to a given value.

4. In an electrical system of distribution, the combination of a main generator, a battery in operative relation thereto, an auxiliary generator provided with a field coil for determining the polarity of the main generator, means for shortcircuiting said coil during the normal operation of the system and means for connecting said field coil to a source of electromotive force independent of the battery, responsive to a change in the battery condition.

5. In an electrical system of distribution, the combination of a main generator, a battery in operative relation thereto, an auxiliary generator governed by the battery current for governing the action of the main generator, and an electromagnetic device for causing the auxiliary generator to suddenly and markedly decrease the output of the main generator when the battery has reached a predetermined condition of charge.

6. In an electrical system of distribution, a variable speed generator, a work circuit and storage battery arranged to be fed thereby simultaneously, an auxiliary source of electromotive force connected to regulate the output of the generator, windings connected to regulate the action of said source responsive to change in the battery charging current to cause the generator to maintain a substantially constant charging current, and windings connected to regulate the action of said source to cut down the battery charging current responsive to a certain rise in battery voltage.

7. In an electrical system of distribution, the combination of a main generator, a storage battery in operative relation thereto, an auxiliary generator connected to be responsive to variations in the battery charging current controlling the field of said main generator and normally maintaining a practically constant charging current substantially throughout the charging of the battery, and means actuated upon an increase of electromotive force of the battery when the same is substantially charged, for substantially reducing the charging current.

8. In an electrical system of distribution, a variable speed generator, a work circuit and storage battery arranged to be fed thereby simultaneously, an auxiliary opposing dynamo connected to regulate the output of the generator, windings connected to regulate the action of said opposing dynamo responsive to changes in the battery charging current to cause the generator to maintain a substantially constant charging current, and windings connected to regulate the action of said opposing dynamo to cut down the battery charging current when the battery has become charged.

9. In an electrical system of distribution, the combination of a main generator, a battery in operative relation thereto, an auxiliary generator for governing the action of the main generator, a coil in the battery circuit for regulating the auxiliary generator, an electroresponsive device connected directly across the terminals of the battery and arranged to be actuated upon a change of electromotive force thereof, and means affecting the field strength of said auxiliary generator by the actuation of said device.

10. In an electrical system of distribution, the combination of a main generator, a battery arranged to be charged thereby, an auxiliary generator for governing the action of said main generator and provided with a field coil, connected to the battery, and an electromagnetic device for reversing the connections of said field coil when the battery has become sufficiently charged.

11. In an electrical system of distribution, the combination of a main generator, a storage battery arranged to be charged thereby, an auxiliary generator for regulating the main generator and provided with a field coil substantially deënergized during the normal operation of the system, and an electroresponsive device for connecting said field coil across the terminals of the main generator when the battery voltage has reached a predetermined value.

12. In an electrical system of distribution, the combination of a main generator, a battery arranged to be charged thereby, an auxiliary generator, connections whereby the auxiliary generator is arranged to aid the main generator to build up its field when the system is started up and field windings on the auxiliary generator connected to be supplied from the battery, and automatic means for increasing the energization of said field coil when the battery has reached a predetermined state of charge.

13. In an electrical system of distribution, the combination of a main generator, a battery arranged to be charged thereby, an auxiliary generator for regulating the action of the main generator, a field coil on the auxiliary generator connected to the battery, means for short-circuiting said field coil during the normal operation of the system and an electromagnetic device for reversing the connections of said field coil when the battery has reached a predetermined state of charge.

14. In an electrical system of distribution, the combination of a main generator, a battery arranged to be charged thereby, an auxiliary generator for regulating the action of the main generator, provided with a field coil for regulating responsive to variations in the battery charging current and a field coil for materially aiding the action of said first mentioned coil when the battery has reached a predetermined state of charge.

15. In an electrical system of distribution, the combination of a main generator, a battery arranged to be charged thereby, an auxiliary generator for regulating the action of the main generator, provided with field windings and connections whereby it is arranged to regulate responsive to variations in the battery charging current and a field coil for materially varying the charging current, and an electroresponsive device for controlling said last mentioned field coil responsive to a change in the battery voltage.

In testimony whereof, I have signed my name to this specification, in the presence of two subscribing witnesses.

WILLIAM A. TURBAYNE.

Witnesses:
T. M. PATTERSON,
W. H. PATTENDEN.